United States Patent Office 3,689,370
Patented Sept. 5, 1972

3,689,370
PROCESS FOR PURIFYING HYDROFLUORIC ACID BY DISTILLATION WITH AN OXIDIZING AGENT AND A FERROUS SALT
Yonosuke Osaka and Kinya Watanabe, Osaka, Kohji Tamura, Kobe, and Heikitsu Sonoyama, Satoru Matsuda, Masao Haruhana, and Hideo Matoba, Osaka, Japan, assignors to Daikin Kogyo Kabushiki Kaisha, Osaka, Japan
No Drawing. Filed Feb. 17, 1971, Ser. No. 116,257
Claims priority, application Japan, Feb. 20, 1970, 45/14,996
Int. Cl. C01b 7/22
U.S. Cl. 203—31        7 Claims

ABSTRACT OF THE DISCLOSURE

In purifying hydrofluoric acid containing arsenic and/or antimony compounds as impurities by treating it with alkali metal permanganate and/or dichromate and distilling the resultant liquid, the present process is characterized in that said distillation is conducted in the presence of an inorganic ferrous salt.

---

This invention relates to a process for purifying hydrofluoric acid, more particularly to an improved process for effectively removing impurities, especially arsenic and/or antimony compounds from hydrofluoric acid.

It has heretofore been known that hydrofluoric acid generally contains a very small amount of arsenic or antimony. Flourite used as a material for producing hydrofluoric acid contains small amounts of arsenic and/or antimony and, when fluorite is reacted with sulfuric acid to prepare hydrofluoric acid, such impurities remain in the resultant hydrofluoric acid in the form of fluoride. In fact, the hydrofluoric acid obtained generally contains arsenic fluoride or antimony fluoride in an amount of 0.0005 to 0.1 wt. percent.

The presence of arsenic or antinony, very small as it is in amount, may bring about a serious result depending upon the use of hydrofluoric acid. For example, hydrofluoric acid to be used as cleaning agent and etching agent for a semiconductor, especially for a silicon semiconductor, has to be high in purity and the presence of arsenic and/or antimony, though in small amount, exerts an adverse influence on the properties of the semiconductor.

In an attempt to fulfill the need to remove small amounts of arsenic and antimony from hydrofluoric acid, a process has already been proposed by which hydrofluoric acid containing such impurities is treated with alkali metal permanganate and/or dichromate to convert arsenic and/or antimony compounds to non-volatile compounds which can be separated from volatile hydrofluoric acid and the hydrofluoric acid thus treated is then distilled.

Although arsenic and/or antimony can be removed satisfactorily by this process, the process has a drawback in that compounds of manganese and/or chromium are distilled out into the distillate at the initial stage of distillation. When the hydrofluoric acid purified by the above process is applied to semiconductor as cleaning agent and etching agent, the presence of such manganese and/or chromium exerts an objectionable influence on the semiconductor. Accordingly, if a purified hydrofluoric acid which is free from arsenic and/or antimony and chromium and/or manganese is intended to obtain by the above known method, the initial distillate has to be discarded. Since hydrofluoric acid is expensive, this process is far from being economical. In order to prevent loss of hydrofluoric acid experienced with this process, it may be possible to employ a multi-tray rectification tower to minimize the initial distillate, but an attempt to reduce he manganese or chromium content to such amount as will not affect a silicon semiconductor, namely to 0.01 p.p.m. or lower requires a long period of time and results in an inevitable loss of considerable amount of initial distillate.

A primary object of the present invention is to provide a purifying process by which impurities, i.e. arsenic and/or antimony, containing in hydrofluoric acid are removed by the use of an alkali metal permanganate and/or dichromate without any distillation of manganese and/or chromium compounds resulting from the use of the purifying agent, and which is therefore capable of effecting efficient and economical purification by a relatively short period of distillation and with a small loss.

The above and other objects of this invention will become apparent from the following description.

The object of the present invention is accomplished by a process comprising the steps of:

(1) contacting hydrofluoric acid containing arsenic and/or antimony compounds as impurities with at least one of the alkali metal permanganate and dichromate to convert the arsenic and/or antimony compounds to non-volatile compounds which can be separated from volatile hydrofluoric acid;

(2) adding an inorganic ferrous salt to the hydrofluoric acid thus treated; and (3) subjecting the resulting mixture to distillation.

The present inventors have conducted extensive researches on a process for purifying hydrofluoric acid with the use of alkali metal permanganate and/or dichromate as purifying agent and incidentally found a novel fact that when an inorganic ferrous salt is added to hydrofluoric acid which has been treated with the above purifying agent and the resulting mixture is then subjected to distillation, manganese and chromium compounds can be completely prevented from being distilled out into the resulting distillate.

The hydrofluoric acid to be purified in accordance with the present invention is anhydrous hydrofluoric acid or hydrofluoric acid having a concentration of at least 95 wt. percent, the acid containing 0.0005 to 0.1 wt. percent of arsenic and/or antimony as impurities.

According to this invention, the above hydrofluoric acid is first treated with an alkali metal permanganate and/or an alkali metal dichromate serving as purifying agent. Examples of such purifying agent are potassium permanganate, sodium permanganate, potassium dichromate, sodium dichromate and the like, among which potassium permanganate is the most preferable. The purifying agent may be used alone or in combination. The above treating step is already known and the treatment may be conducted under the same conditions as in the known method. More specifically, the alkali metal salt of permanganic acid and/or dichromic acid is added to the hydrofluoric acid to be purified and the mixture is stirred. Most preferably, the purifying agent may be added in the form of powder, but it may also be used in the form of an aqueous solution or hydrofluoric acid solution. The amount of the purifying agent used may vary over a wide range depending on the amount of impurities contained in hydrofluoric acid. Generally, it is preferable to use the alkali metal permanganate or alkali metal dichromate in an amount of 1 to 50 equivalents, preferably 2 to 10 equivalents, per equivalent of arsenic and/or antimony, wherein one equivalent of alkali metal permanganate corresponds to ⅕ gram-mole thereof, one equivalent of alkali metal dichromate to ⅓ gram-mole thereof and one equivalent of arsenic or antimony to ½ gram-atom thereof. The purification system may preferably contain at least one gram-ion of alkali metal ions per gram-atom of arsenic and/or antimony. Although the presence of a greater amount of the alkali metal ions will not produce any adverse effect, the metal ions may preferably be present in an amount of less than 50 gram-ions per gram-atom of arsenic and/or antimony. When the amount of the alkali metal released from the purifying agent is smaller than the above amount, alkali metal compound in the form of KF, NaF, KOH, NaOH or the like may be added to obtain alkali metal ions in the amount in the above range. The purifying agent added to hydrofluoric acid is uniformly mixed therewith by stirring, whereby the impurities, i.e. arsenic and/or antimony, in the hydrofluoric acid are converted to a nonvolatile substance which can be separated from hydrofluoric acid. Purification is conducted at a temperature of about −10 to 60° C., generally at room temperature in a sealed container. The period for purification is generally about 10 minutes to 24 hours, although it varies over a wide range depending upon stirring conditions and the amount of impurities.

According to this invention, it is essential to add an inorganic ferrous salt to the hydrofluoric acid treated as above and to thereafter subject the resultant mixture to distillation. The inorganic ferrous salt to be used includes, for example, ferrous sulfate, ferrous fluoride, ferrous chloride, ferrous hydroxide, etc., among which ferrous sulfate is the most preferable. It is desirable to use such inorganic ferrous salt in the form of aqueous solution, diluted hydrofluoric acid solution or diluted sulfuric acid solution. The amount of such ferrous salt may vary depending upon the kind of the salt used and the amount of arsenic and/or antimony contained in hydrofluoric acid. Generally, 0.1 to 5 equivalents of the ferrous salt may preferably be used per equivalent of manganese and/or chromium, the most preferable amount being 0.2 to 2 equivalents, wherein one equivalent of ferrous salt corresponds to 1 gram-atom thereof, one equivalent of manganese to ⅕ gram-atom thereof and one equivalent of chromium to ⅓ gram-atom thereof. The hydrofluoric acid containing the ferrous salt added thereto is then subjected to distillation. Distillation is usually carried out under reduced or atmospheric pressure at a temperature of about −10 to 60° C. In accordance with this invention, the distillation gives a highly purified hydrofluoric acid containing less than 0.01 p.p.m. of arsenic and/or antimony and less than 0.01 p.p.m. of manganese and/or chromium.

Examples of this invention will be given below, in which percentage is by weight.

EXAMPLE 1

200 g. of finely comminuted $KMnO_4$ was added to 1450 kg. of 97% hydrofluoric acid containing 5 p.p.m. of arsenic (in weight ratio relative to hydrofluoric acid the same as hereinafter) and 1 p.p.m. of antimony in a closed iron container and the mixture was stirred at 25° C. for 3 hours. To the hydrofluoric acid thus treated was then added a solution prepared by dissolving 600 g. of $FeSO_4·7H_2O$ in 5 liters of 50% hydrofluoric acid and the mixture was stirred at 25° C. for 1 hour. The liquid thus prepared was then subjected to simple distillation at 20 to 50° C., whereby hydrofluoric acid was obtained at a rate of 20 kg./h. After initiation of distillation, the manganese content in the hydrofluoric acid distilled was determined by analysis with the following results:

In 1 hour—less than 0.01 p.p.m.
In 18 hours—less than 0.01 p.p.m.

In 60 hours 1200 kg. of a purified hydrofluoric acid was obtained. Analytical values of arsenic, antimony and manganese contents were 0.00 p.p.m. 0.00 p.p.m. and less than 0.01 p.p.m. respectively

Comparison Example 1

Hydrofluoric acid was treated with $KMnO_4$ and then subjected to simple distillation in the same manner as in Example 1 except that no $FeSO_4·7H_2O$ was added and that distillation was terminated 18 hours after the initiation of distillation. The analytical values of manganese in the distillate was as follows:

In 1 hour—25 p.p.m.
In 18 hours—5 p.p.m.

EXAMPLE 2

250 g. of finely comminuted $K_2Cr_2O_7$ was added to 1450 kg. of 97% hydrofluoric acid containing 5 p.p.m. of arsenic and 1 p.p.m. of antimony in an iron container and the mixture was stirred at 25° C. for 3 hours. To the hydrofluoric acid thus treated was then added a solution prepared by dissolving 600 g. of $FeSO_4·7H_2O$ in 5 liters of 50% hydrofluoric acid and the mixture was stirred at 25° C. for 1 hour. The liquid thus prepared as then subjected to simple distillation at a rate of 20 kg./h. in terms of hydrofluoric acid at 20° C. to 50° C. After initiation of distillation, the chromium content in the hydrofluoric acid distilled was determined by analysis with the following results:

In 1 hour—less than 0.01 p.p.m.
In 18 hours—less than 0.01 p.p.m.

1200 kg. of a purified hydrofluoric acid was obtained in 60 hours. The analytical values of arsenic, antimony and chromium contents were 0.00 p.p.m., 0.00 p.p.m. and less than 0.01 p.p.m. respectively.

Comparison Example 2

Hydrofluoric acid was treated with $K_2Cr_2O_7$ and then subjected to simple distillation in the same manner as in Example 2 except that no $FeSO_4·7H_2O$ was added and that distillation was terminated 18 hours after the initiation of distillation The analytical values of chromium in the distillate were as follows:

In 1 hour—40 p.p.m.
In 18 hours—10 p.p.m

EXAMPLE 3

100 g. of finely comminuted $KMnO_4$ was added to 1450 kg. of 97% hydrofluoric acid containing 5 p.p.m. of arsenic and 1 p.p.m. of antimony in an iron container and the mixture was stirred at 25° C. for 3 hours. To the hydrofluoric acid thus treated was then added a solution prepared by dissolving 200 g. of $FeSO_4·7H_2O$ in 5 liters of 50% hydrofluoric acid and the mixture was stirred at 25° C. for 1 hour. The liquid thus prepared was then subjected to simple distillation at 20 to 50° C., whereby hydrofluoric acid was obtained at a rate of 20 kg./h. One hour after initiation of distillation, arsenic, antimony and managanese contents in the hydrofluoric acid distilled were determined by analysis with the following results:

As (p.p.m.) 0.00
Sb (p.p.m.) 0.00
Mn (p.p.m.) <0.01

EXAMPLES 4 TO 6

31.6 g. of finely comminuted $KMnO_4$ was added to 1450 kg. of 97% hydrofluoric acid containing 5 p.p.m. of arsenic and 1 p.p.m. of antimony in a closed iron container and the mixture was stirred at 25° C. for 3 hours. To the hydrofluoric acid thus treated was then added a solution prepared by dissolving the predetermined amount of $FeSO_4·7H_2O$ in 5 liters of 50% hydrofluoric acid and the mixture was stirred at 25° C. for 1 hour. The liquid thus prepared was then subjected to simple distillation at 20 to 50° C., whereby hydrofluoric acid was obtained at a rate of 20 kg./h. One hour after initiation of distillation, the arsenic, antimony and manganese contents in the hydrofluoric acid distilled were determined by analysis with the results shown in Table 1 below:

TABLE 1

| Example No. | Amount of $FeSO_4 \cdot 7H_2O$ | | Analytical values (p.p.m.) | | |
|---|---|---|---|---|---|
| | G. | Eq./eq. of Mn | As | Sb | Mn |
| Contrast | 0 | 0 | 0.00 | 0.00 | 5 |
| 4 | 41.7 | 0.15 | 0.00 | 0.00 | 0.01 |
| 5 | 55.7 | 0.2 | 0.00 | 0.00 | <0.01 |
| 6 | 139 | 0.5 | 0.00 | 0.00 | <0.01 |

EXAMPLE 7

200 g. of finely comminuted $KMnO_4$ was added to 1450 kg. of 97% hydrofluoric acid containing 30 p.p.m. of arsenic in a closed iron container and the mixture was stirred at 25° C. for 3 hours. To the hydrofluoric acid thus treated was then added a solution prepared by dissolving 600 g. of $FeSO_4 \cdot 7H_2O$ in 5 liters of 50% hydrofluoric acid and the mixture was stirred at 25° C., for 1 hour. The liquid thus prepared was then subjected to simple distillation at 20 to 50° C., whereby hydrofluoric acid was obtained at a rate of 20 kg./h. One hour after initiation of distillation, the arsenic and manganese contents in the hydrofluoric acid distilled were determined by analysis with the results shown in Table 2 below:

TABLE 2

| Example No. | Amount of $FeSO_4 \cdot 7H_2O$ | | Analytical values (p.p.m.) | |
|---|---|---|---|---|
| | G. | Eq./eq. of Mn | As | Mn |
| Contrast | 0 | 0 | 0.00 | 15 |
| 7 | 600 | 2.16 | 0.00 | <0.01 |

What we claim is:

1. A process for purifying hydrofluoric acid comprising the steps of:
   (1) contacting hydrofluoric acid containing at least one of arsenic and antimony compounds as impurities with a least one of alkali metal permanganate and dichromate to covert the impurities to non-volatile compounds which can be separated from volatile hydrofluoric acid;
   (2) adding an inorganic ferrous salt to the hydrofluoric acid thus treated; and
   (3) subjecting the resulting mixture to distillation.

2. The process according to claim 1 in which said alkali metal permanganate is potassium permanganate.

3. The process according to claim 1 in which said alkali metal permanganate and/or alkali metal dichromate is used in an amount of 1 to 50 equivalents per equivalent of arsenic and/or antimony.

4. The process according to claim 3 in which said amount of alkali metal permanganate and/or dichromate is in the range of 2 to 10 equivalents per equivalent of arsenic and/or antimony.

5. The process according to claim 1 in which said ferrous salt is ferrous sulfate.

6. The process according to claim 1 in which said ferrous salt is used in an amount of 0.1 to 5 equivalents per equivalent of manganese and/or chromium.

7. The process according to claim 6 in which said ferrous salt is used in an amount of 0.2 to 2.0 equivalent of manganese and/or chrominum.

References Cited

UNITED STATES PATENTS

| 3,039,850 | 6/1962 | Zanon et al. | 203—31 |
| 3,166,379 | 1/1965 | Bradley et al. | 203—31 |

FOREIGN PATENTS

| 266,930 | 1/1964 | Australia | 23—153 |

WILBUR L. BASCOMB, Jr., Primary Examiner

U.S. Cl. X.R.

203—33, 51; 23—153